United States Patent
Wu et al.

(10) Patent No.: US 8,274,758 B2
(45) Date of Patent: Sep. 25, 2012

(54) COMPOSITE WRITER SHIELD FOR IMPROVING WRITER PERFORMANCE

(75) Inventors: Yan Wu, Cupertino, CA (US); Kowang Liu, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 1140 days.

(21) Appl. No.: 12/157,683

(22) Filed: Jun. 12, 2008

(65) Prior Publication Data
US 2009/0310262 A1    Dec. 17, 2009

(51) Int. Cl.
*G11B 5/147* (2006.01)
(52) U.S. Cl. .................................... 360/125.12
(58) Field of Classification Search ............ 360/125.12, 360/125.16, 125.22, 125.26, 125.5, 125.63, 360/317
See application file for complete search history.

(56) References Cited

U.S. PATENT DOCUMENTS

| | | | |
|---|---|---|---|
| 5,132,859 A * | 7/1992 | Andricacos et al. ........ 360/125.5 |
| 5,311,387 A * | 5/1994 | Mallary .................... 360/125.02 |
| 6,301,075 B1 * | 10/2001 | Sato ............................ 360/125.5 |
| 6,466,416 B1 * | 10/2002 | Honjo et al. .................. 360/317 |
| 6,473,960 B1 * | 11/2002 | Schwartz et al. .......... 29/603.14 |
| 6,507,457 B2 * | 1/2003 | He et al. ..................... 360/125.5 |
| 6,538,845 B1 * | 3/2003 | Watanabe et al. ........ 360/125.43 |
| 6,562,487 B1 * | 5/2003 | Vas'ko et al. ............... 428/815.2 |
| 6,791,794 B2 * | 9/2004 | Honjo et al. .............. 360/123.26 |
| 7,023,659 B2 * | 4/2006 | Honjo et al. ................. 360/125.5 |
| 7,106,554 B2 * | 9/2006 | Guan et al. ................ 360/125.16 |
| 7,221,539 B2 | 5/2007 | Takano et al. |
| 7,307,815 B2 | 12/2007 | Han et al. |
| 7,369,360 B2 * | 5/2008 | Vas'ko et al. ............. 360/125.12 |
| 7,397,632 B2 * | 7/2008 | Miyake et al. ........... 360/125.12 |
| 2006/0002021 A1 | 1/2006 | Li et al. |
| 2006/0044677 A1 | 3/2006 | Li et al. |
| 2007/0165330 A1 | 7/2007 | Yamaguchi et al. |
| 2007/0279803 A1 | 12/2007 | Hirata et al. |
| 2008/0002293 A1 | 1/2008 | Sasaki et al. |

* cited by examiner

*Primary Examiner* — Angel Castro
(74) *Attorney, Agent, or Firm* — Saile Ackerman LLC; Stephen B. Ackerman

(57) ABSTRACT

A PMR writer in a read/write head is disclosed wherein an upper shield covering the coil layer is comprised of a magnetic layer optimized for magnetic performance and a second layer used for tuning mechanical protrusion. The composite layer simultaneously provides high saturation magnetization and high permeability from the magnetic layer and low CTE from the second layer which tunes the relative spacing between the writer, reader, and the rest of the slider. In one embodiment, first and second write shields are formed on a write gap layer and have front portions at the ABS and back portions in a back gap region. The upper write shield connects on one side with the second write shield at the ABS and on a second side with the back gap region. This design can yield better reader and writer spacing for the same physical clearance which enables products with higher recording density.

11 Claims, 3 Drawing Sheets

COMPOSITE WRITER SHIELD FOR IMPROVING WRITER PERFORMANCE

RELATED PATENT APPLICATION

This application is related to the following: Ser. No. 10/886,284, filing date Jul. 7, 2004; which is assigned to a common assignee and is herein incorporated by reference in its entirety.

FIELD OF THE INVENTION

The invention relates to a composite shield in a perpendicular magnetic recording head (PMR) and a method for making the same. The design features a write shield layer comprised of a magnetic alloy optimized for magnetic performance above the coil layer and a second write shield layer made of a material with a low coefficient of thermal expansion (CTE) to optimize the mechanical performance related to the control of reader and writer spacing.

BACKGROUND OF THE INVENTION

Perpendicular recording has been developed in part to achieve higher recording density than is realized with longitudinal recording devices. A PMR write head typically has a main pole layer with a small surface area at an air bearing surface (ABS) and coils that conduct a current and generate a magnetic flux in the main pole that exits through a write pole tip and enters a magnetic media (disk) adjacent to the ABS. The flux may return through a shield structure to the back gap region which connects the main pole with the shield structure. There is typically one or more write shields on the write gap layer above the main pole and along the ABS and an upper section of the shield structure which may have an arched shape is formed over the coil layer and connects the one or more write shield sections along the ABS to the back gap region.

Perpendicular magnetic recording has become the mainstream technology for disk drive applications beyond 150 Gbit/in$^2$. The demand for improved performance drives the need for a higher areal density which in turn calls for a continuous reduction in transducer size. A PMR head which combines the features of a single pole writer and a double layered media (magnetic disk) has a great advantage over LMR in providing higher write field, better read back signal, and potentially much higher areal density. Typically, today's magnetic head consists of a writer and a reader as separate elements that are formed adjacent to one another along an ABS. The read head may be based on a TMR element in which a tunnel barrier layer separates two ferromagnetic (FM) layers where a first FM layer has a fixed magnetization direction and the second FM layer has a magnetic moment that is free to rotate about a direction orthogonal to the direction of the magnetic moment in the reference "fixed" layer. The resistance across the barrier changes as the free layer moment is rotated. This signal is used to detect the small magnetic field from the recorded magnetization pattern on the media.

Reducing the magnetic spacing from read/write heads to the magnetic media during both writing and reading is the most important factor in achieving better performance in high density recording. The writer and reader are separated by several microns in a typical recording head and are made of several different materials each having a unique CTE. Therefore, the protrusion of the reader and writer are usually quite different due to the effect of varying operating temperatures, applying dynamic flying height (DFH) power to actuate the reader or writer, or from write current excitation. In addition, the point with minimum spacing to disk could be located away from either the reader or the writer, imposing further restrictions to achievable magnetic spacing during reading and writing. Improvements in PMR head design are needed to control the protrusion differences at the writer, the reader and the minimum point, and its variation. In particular, for the touch down and then back off mode of operation using DFH, if the writer protrusion is much more than the reader protrusion, then the minimum reader spacing is determined by the excess protrusion plus any initial protrusion. The ratio of reader protrusion rate/writer protrusion rate is called the gamma ratio. A lower gamma ratio means the writer protrusion rate is much higher than the reader protrusion rate, and could potentially put a greater limit to achievable reader spacing.

An important head design objective is to achieve a gamma ratio as close as possible to 1 which is ideal for tribology and magnetic performance since it keeps the gap between reader and writer at a constant value independent of the DFH power used for actuation. From a drive reliability point of view, the reader should not be at the minfly point which is the mechanically closest part of the head to the disk because the read sensor is more sensitive to mechanical impact. But the additional spacing margin for the reader needs to be kept to as small a number as reliability allows in order to have the best read back performance possible. The shield section above the coil layer (also known as a pp3 structure or third write shield) is known to provide a better gamma ratio when comprised of a lower CTE material such as a high moment CoFe alloy than when made from a lower moment material optimized for magnetic performance such as a 19 kG CoFeNi alloy. On the other hand, the high moment alloy has less desirable magnetic performance which leads to poorer write current saturation speed. Thus, neither a high moment material nor a low moment material by itself can provide an optimal performance. An improved pp3 design is desired in order to simultaneously achieve good mechanical performance (gamma ratio) and magnetic performance such as write current saturation speed.

A search of the prior art revealed the following references that relate to a write shield.

U.S. Patent Application No. 2007/0165330 that the write shield may be comprised of two or more layers and includes the entire shield structure on the write gap layer along the ABS. The composition and desired properties of the write shield structure are not disclosed.

U.S. Patent Application No. 2007/0279803 includes a write shield comprised of a lower throat defining layer on the write gap layer and a yoke structure made of FeNi, FeCo, or FeCoNi that is formed over the coil layer.

In U.S. Pat. No. 7,221,539, a main shield is described as having a composition including Co, Fe, CoNiFe, FeCo, and composites and laminates thereof, but there is no disclosure regarding the content of the upper shield section of the main shield structure.

U.S. Patent Application No. 2008/0002293 shows a write shield over a coil layer wherein the write shield is made of CoNiFe or CoFe.

U.S. Patent Application No. 2006/0002021 describes a write shield structure with three write shield layers including an upper (arched) shield having a CoNiFe composition.

U.S. Pat. No. 7,307,815 discloses an overarching yoke portion of a shield structure that is made of CoNiFe with a thickness between 0.5 and 1.5 microns.

None of the prior art references refer to modifying the composition of the pp3 portion of the write shield in order to optimize both magnetic and mechanical properties.

SUMMARY OF THE INVENTION

One objective of the present invention is to provide a pp3 section of a main shield structure in a PMR write head with a configuration and composition that yields improved performance compared with a single magnetic layer that is optimized for magnetic performance (for example, a 19 kG material), or a single magnetic layer that is more optimal for mechanical performance but with compromised magnetic performance (for example, a 24 kG material with lower CTE).

Another objective of the present invention is to provide a pp3 section of a main shield structure according to the first objective that is readily implemented in manufacturing with a minimum number of changes in the fabrication process.

According to the present invention, these objectives are achieved in an embodiment wherein a PMR write head has a main pole layer with a write pole tip along an ABS. Above the main pole layer and along the ABS is a write gap layer that separates the main pole from the remainder of the write head. There is a first shield formed on the write gap layer that has a thickness along the ABS plane and extends a throat height distance towards the back gap section. Likewise, a second shield is formed on the first shield and has a thickness along the ABS and extends toward the back gap section. In one aspect, the back gap section is comprised of a portion of the first and second shields that is formed on a connection area of the main pole layer where the connection area is at an opposite end of the main pole with respect to the ABS. Between the first and second shields and the back gap section are one or more insulation layers formed on the write gap layer and a coil layer with a plurality of turns formed in the one or more insulation layers. A key feature is a third write shield (pp3 section) with one end exposed at the ABS and connected to the second shield, a second end attached to the back gap section, and a middle portion that overlies the one or more insulation layers and the coil layer. The third write shield may have an arched shape or may have top and bottom surfaces that are essentially parallel to the plane of the main pole layer and perpendicular to the ABS.

In a preferred embodiment, the pp3 shield section has a configuration comprised of a lower 19 kG layer that contacts the back gap section and second shield, and an upper 24 kG layer formed on a top side of the 19 kG layer which is opposite a bottom side that faces the one or more insulation layers and plurality of coils. Preferably, the 19 kG layer is made of a CoNiFe alloy with high permeability and the 24 kG layer is comprised of a CoFe alloy that has a low CTE. However, each of the aforementioned alloys may include one or two additional elements such as V in the alloy.

The main pole layer may be formed by electroplating a material such as CoFe or CoNiFe in a mold within a first insulation layer according to a well known process. A CMP step is used to make the first insulation layer coplanar with the main pole layer. A write gap layer is then deposited on the main pole layer and first insulation layer and a connection area is opened over a back end portion of the main pole layer that will enable a subsequently formed first write shield to make contact with the main pole layer. A first write shield is formed by selective plating and a first portion thereof contacts the connection area while a second portion is formed on the write gap layer along the ABS and extends a throat height distance from the ABS over the pole tip region. Once a photoresist layer and underlying seed layer used for the selective plating are removed, a second insulation layer is deposited to fill the opening vacated by stripping the photoresist layer. The second insulation layer and first write shield are planarized simultaneously. The write head is completed by building a second write shield above the first write shield and a coil layer within a third insulation layer between front and back portions of the second write shield followed by forming a fourth insulation layer on the coil layer and forming a third write shield (pp3 shield section) on the second write shield and fourth insulation layer. The pp3 shield section may be formed by an electroplating process in which the 19 kG layer is deposited in a first step and the 24 kG layer is deposited in a second step.

DETAILED DESCRIPTION OF THE INVENTION

The present invention relates to a PMR write head, and in particular, to the upper section of a write shield that imparts the combined characteristics of a layer made of low CTE material and another layer optimized for magnetic properties for high density recording. Although only a PMR write head is depicted, the PMR writer may be part of a read/write head configuration as appreciated by those skilled in the art. The present invention is also a method of forming a PMR write head comprised of a two layer upper shield section. The drawings are provided by way of example and are not intended to limit the scope of the invention.

Figure 1:
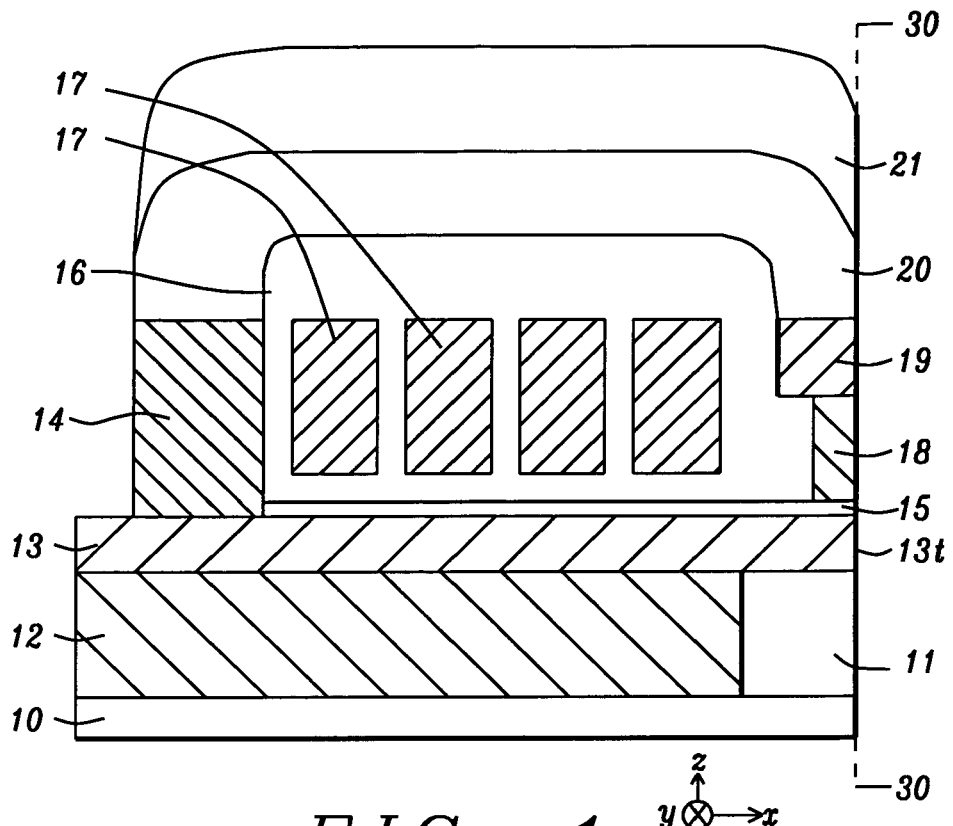
FIG. 1 is a cross-sectional view showing a PMR write head with a main shield comprised of a pp3 section that has two layers according to the present invention.
Figure 2:
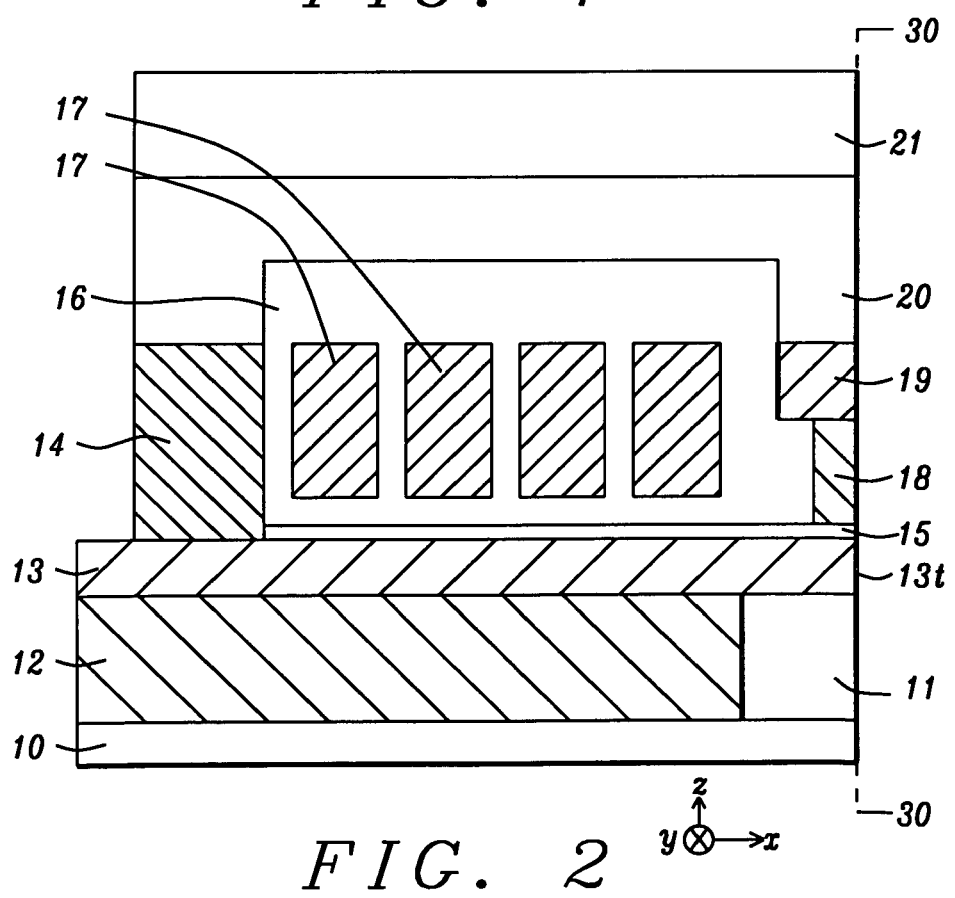
FIG. 2 is a cross-sectional view of a PMR write head according to a second embodiment of the present invention where the pp3 section of the main shield has two layers and a planar top surface rather than an arched shape as in FIG. 1.
Figure 3:
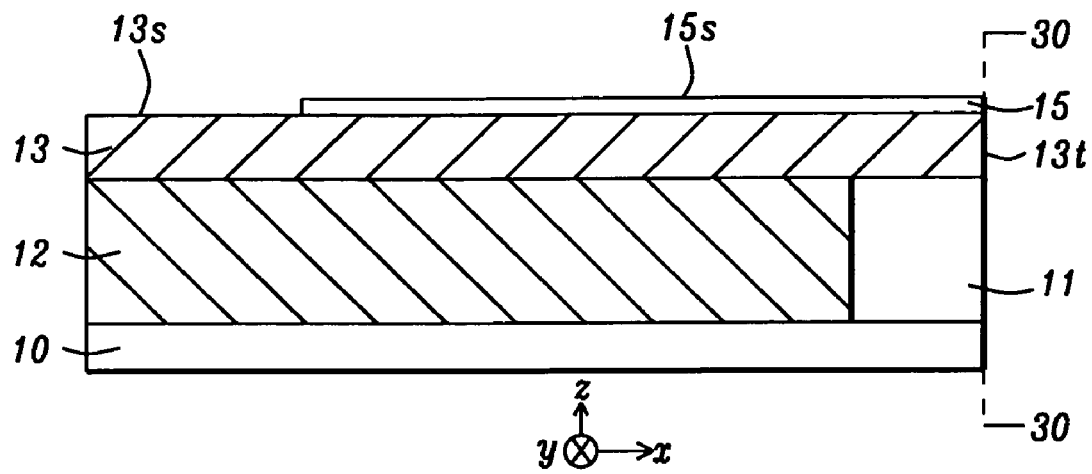
FIG. 3 is a cross-sectional view showing the main pole layer and an overlying write gap layer formed on a bottom yoke according to a method of the present invention.

First a method of forming the PMR writer according to the present invention will be described. Referring to FIG. 3, a cross-sectional view is shown from a plane that is perpendicular to an air bearing surface (ABS) 30-30. There is a substrate 10 that may be a separation layer made of $Al_2O_3$ between a read head (not shown) and the PMR write head as described herein and shown in its entirety in FIGS. 1-2. The embodiment illustrated in FIG. 1 includes an arched shape for the upper shield section comprised of a lower layer 20, and upper layer 21 where lower layer is defined as the layer that connects with a second write shield and is closer to the main pole layer 13. A second embodiment in FIG. 2 shows an upper shield section with lower layer 20, and upper layer 21 that have essentially planar top surfaces opposite the main pole layer 13. It should be understood that the substrate 10 may be part of a slider (not shown) formed in an array of sliders on a wafer. After the PMR write head is completed, the wafer is sliced to form rows of sliders. Each row is typically lapped to afford an ABS before dicing to fabricate individual sliders that are used in a magnetic recording device.

Returning to FIG. 3, a first embodiment is depicted wherein an etch stop layer (not shown) such as Ru may be deposited on the substrate 10. A first insulation layer 11 is deposited on the etch stop layer by a physical vapor deposition (PVD) or chemical vapor deposition (CVD) method. An opening (not shown) corresponding to the shape of the bottom yoke is formed in the first insulation layer 11 by conventional photoresist patterning and etching steps. After the patterned photoresist layer is stripped, a seed layer (not shown) may be deposited in the opening. Thereafter, the bottom yoke 12 may be formed by an electroplating method and is made coplanar with the first insulation layer by a chemical mechanical polish (CMP) step. The main pole layer 13 including pole tip 13t at the ABS 30-30 may be formed in a similar fashion by depositing a second insulation layer (not shown) on the first insulation layer 11 and bottom yoke 12 followed by forming an opening in the second insulation layer corresponding to the desired shape of the main pole layer, and then electroplating the main pole layer to fill the opening. A second CMP step may be employed to planarize the main pole layer 13. The main pole layer 13 and bottom yoke 12 may be comprised of CoFe, CoFeN, or CoFeNi. Note that the bottom yoke 12 is recessed a certain distance along the x-axis direction from the ABS while the write pole tip 13t terminates at the ABS 30-30.

The present invention also encompasses an embodiment (not shown) wherein the main pole layer and yoke are laid down in reverse order to provide a top yoke configuration. In other words, the main pole layer is formed on the first insulation layer and a top yoke is formed on the main pole layer. Either the bottom yoke configuration in FIG. 3 or the top yoke configuration represent a yoke/main pole layer stack that may be employed in the present invention. In either case, the main pole layer terminates in a pole tip at the ABS.

In another embodiment, a bottom yoke layer 12 is formed coplanar with a first insulation layer 11 on substrate 10 by a conventional method. A seed layer (not shown) such as CoNiFe or CoFeN may be sputter deposited on the first insulation layer 11 and bottom yoke 12. Next, a photoresist layer (not shown) is coated and patterned on the seed layer to generate an opening that corresponds to the desired shape of the main pole layer. Then the main pole layer 13 that terminates in a pole tip 13t is electroplated on the seed layer within the opening. The main pole layer is comprised of a material such as CoFeNi, CoFeN, or CoFe that has a high saturation magnetic flux density (Bs).

Alternatively, the main pole layer could be formed through a physical deposition process where a multilayer structure consisting of magnetic and non-magnetic layers is interspersed in order to control the remanant moment of the main pole layer. It should be understood that the ABS 30-30 is not defined until a lapping process is performed after the PMR writer including the shield structure is fabricated but for the purpose of this discussion the ABS is depicted at the beginning of the fabrication process.

The method of the present invention also encompasses one or more additional steps of shaping the main pole layer 13 and write pole tip 13t such as ion milling that are described in related patent application Ser. No. 10/886,284 which is herein incorporated by reference in its entirety.

After the shape of the main pole layer 13 is determined by electroplating and ion milling, for example, a second insulation layer (not shown) is deposited on the first insulation layer 11 and on the main pole layer and is planarized by a CMP process to become coplanar with the main pole layer. The CMP process may thin the main pole layer 13 to a thickness of 0.05 to 0.5 microns in the z-axis direction that represents the track direction during a read or write process.

A write gap layer 15 is deposited by a sputtering process or the like on the main pole layer 13, write pole tip 13t, and second insulation layer (not shown). The write gap layer 15 is made of a non-magnetic material that may be a non-metal such as $Al_2O_3$ or a metal such as Ta or Ru with a thickness of about 200 to 1000 Angstroms. Next, a photoresist layer (not shown) is patterned on the write gap layer and an ion beam etch (IBE) is employed to expose the top surface 13s of the main pole layer 13 in a so-called connection area within the back end region of the PMR write head. Thereafter, the second photoresist layer is stripped by a conventional method.

Figure 4:
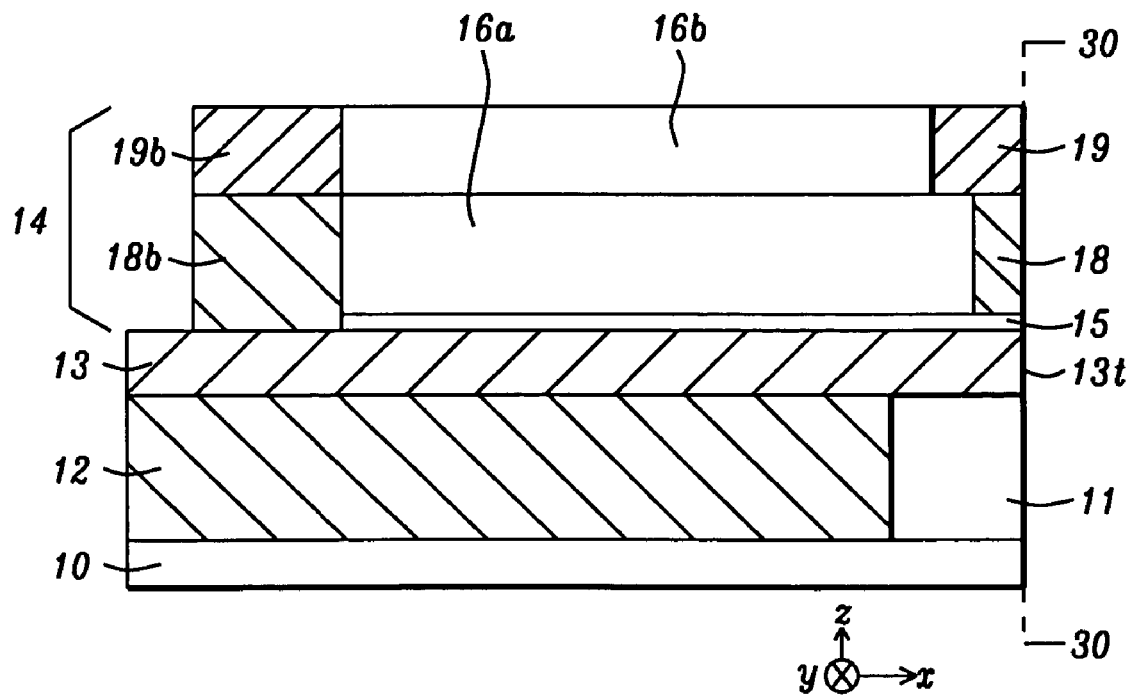
FIG. 4 depicts the partially formed PMR write head shown in FIG. 3 after first and second write shield sections of the main shield are formed on the main pole layer and write gap layer, and insulation layers are deposited between the back gap and ABS.

Referring to FIG. 4, a first write shield 18 may be formed on the connection area 13s and along the ABS 30-30 by a selective electroplating process as described in related patent application Ser. No. 10/886,284. The first write shield 18 may have a thickness in the z-axis direction of about 0.1 to 1.5 microns and may be comprised of CoNiFe, FeCo, or CoFeN. The back end portion 18b of the first write shield is formed on a portion of the connection area 13s and abuts an end of the write gap layer 15 opposite the ABS 30-30. Thereafter, a third insulation layer 16a is deposited by a conventional method and becomes coplanar with the first write shield 18 following a planarization step such as a CMP process. A second write shield 19 is then selectively electroplated on the first write shield 18 and on portions of the third insulation layer 16a and is comprised of a front portion along the ABS 30-30 and a back end section 19b on back end section 18b. Together, back end sections 18b, 19b form a back gap 14 in the PMR write head that serves as a magnetic flux connection between the main pole layer 13 and a third shield comprised of layers 20, 21 (FIGS. 1, 2). A fourth insulation layer 16b is deposited on the third insulation layer 16a and on the second write shield 18 followed by a CMP process to make the fourth insulation layer 16b coplanar with the second write shield 19. The fourth insulation layer 16b may be comprised of a photoresist layer.

Figure 5:
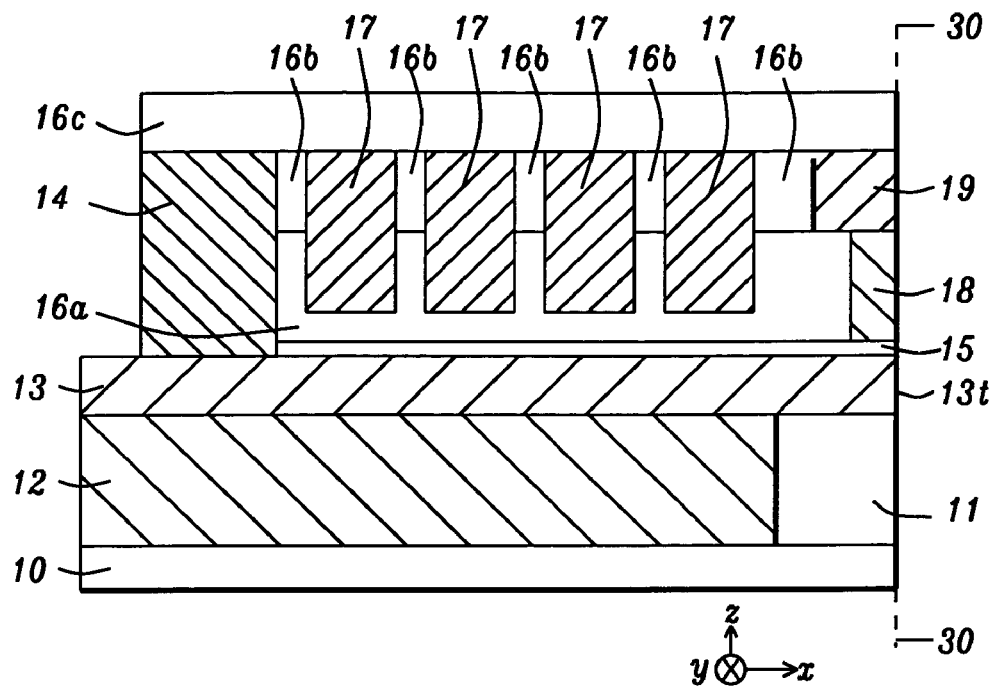
FIG. 5 depicts the partially formed write head in FIG. 4 after an insulation layer is deposited on the second write shield, and the pp3 section of the main shield is formed above the coil layer.

Referring to FIG. 5, a coil layer 17 with a plurality of turns is formed in the fourth insulation layer 16b and may extend partially into the third insulation layer 16a by a well known sequence that includes photoresist patterning, etching to form an opening (not shown), and deposition of a metal such as Cu to fill the opening. In the exemplary embodiment, only four coil turns 17 are depicted to simplify the drawing. A CMP process may be employed to planarize the coil layer 17 which becomes coplanar with the fourth insulation layer 16b. Above the coil layer 17, second write shield 19, and fourth insulation layer 16b is deposited a fifth insulation layer 16c that may be comprised of the same dielectric material as in the third insulation layer 16a. Note that in FIG. 1 and FIG. 2, the insulation layers 16a, 16b, 16c are shown as one insulation layer 16 in order to simplify the drawings.

Referring again to FIG. 1, a key feature of the present invention is a composite third shield (pp3 section) that has a lower layer 20 made of a material optimized for magnetic performance such as a 19 kG CoFeNi alloy, and an upper layer 21 that is preferably comprised of a low CTE material such as a 24 kG CoFe alloy. A 24 kG material has a high saturation magnetization but lower permeability that leads to a poor write current saturation speed while a 19 kG material with high permeability and a low to moderate saturation magnetization results in a good write current saturation speed.

The lower layer 20 is comprised of a first side that adjoins the second shield 19 along the ABS 30-30, a second side connected to the back gap section 14, and a middle section that arches over the coil layer 17 and is connected to the first and second sides. The middle section of lower layer 20 is formed on insulation layer 16 and adjoins insulation layer 16c (FIG. 5). Likewise, the upper layer 21 has a first side which is a front portion that abuts the ABS, a second side that is a back portion formed above the back gap section 14, and a middle section that connects the first side and second side and is formed above the coil layer 17 and insulation layer 16. According to the present invention, "on" means that a certain layer adjoins the layer immediately below in the −z direction while "above" in the preceding sentence means that upper layer 21 does not adjoin the insulation layer 16 but is formed in a more +z direction with respect to substrate 10 than the referenced layer.

The third shield comprised of lower layer 20 and upper layer 21 may be formed by a conventional electroplating process. For example, the lower layer 20 comprised of a material optimized for magnetic performance such as a 19 kG CoFeNi alloy may be electroplated on a seed layer in an opening formed within an insulation layer or photoresist layer (not shown) on insulation layer 16. Preferably, the lower layer 20 has a low saturation magnetic moment and high permeability. Then the upper layer 21 comprised of a low CTE material such as a 24 kG CoFe alloy may be electroplated using a second electroplating bath and deposited on the lower layer 20 within the same opening. In one aspect, lower layer 20 has a thickness of 0.1 to 0.5 microns and upper layer 21 has a thickness between 0.3 and 3 microns. Optionally, one or more other elements such as V may be included in the CoFe alloy and CoFeNi alloy while still maintaining the desired magnetic and mechanical properties for layers 20, 21, respectively.

It should be understood that the layer optimized for mechanical properties need not be magnetic when formed as the upper layer 21 in the third shield stack. Preferably, the thickness of the upper layer 21 can be used to fine tune the protrusion characteristics of the resulting head to achieve optimal overall performance. A low CTE value is defined as a value in the range of 0 to $8 \times 10^{-6}$ K at 20° C. Those skilled in the art will appreciate that a dynamic fly heater or DFH (not shown) is typically activated during a read or write process to thermally expand nearby layers and in effect "pushes" the write pole tip 13t and/or sensor in the read head (not shown) toward a magnetic media that moves in a z-axis direction proximate to the ABS 30-30.

A major benefit according to the present invention is that the write head retains a high saturation magnetic moment and high permeability necessary for a high performance writer because the lower layer 20 is optimized for magnetic performance with little constraint to the protrusion (due to thermal expansion property) while the low CTE upper layer 21 affords better control of read head and write head spacing with respect to a magnetic media than when a single layer is employed as the third shield. In other words, prior art write heads are optimized for either good mechanical properties in a single third shield layer made of sub-optimal magnetic material or are optimized for good magnetic properties with a trade-off in mechanical performance. The composite third shield layer described herein allows for a simultaneous optimization of mechanical and magnetic properties necessary for high performance.

In an alternative embodiment that is not illustrated, the positions of layers 20, 21 may be reversed such that the low CTE layer adjoins the insulation layer 16 and connects with second shield 19 and back gap 14 while the layer 20 with good magnetic property is formed on a top surface of layer 21 which is on the opposite side of layer 21 with respect to insulation layer 16. In this embodiment, the layer optimized for mechanical performance may have some magnetic character. Furthermore, the third shield comprised of layers 20, 21 may have an arched shape or a shape with essentially planar top surfaces for layers 20, 21. In this embodiment, layer 20 has a thickness from 0.3 to 3 microns while layer 21 has a thickness between 0.1 and 0.5 microns.

The embodiments depicted in FIGS. 1, 2 and the alternative embodiment in the preceding section may be further comprised of an overcoat layer made of a dielectric material that is formed on the third shield. The ABS 30-30 is formed by a conventional lapping process after all layers including an overcoat layer are formed in the PMR write head structure on the substrate 10.

Figure 6:
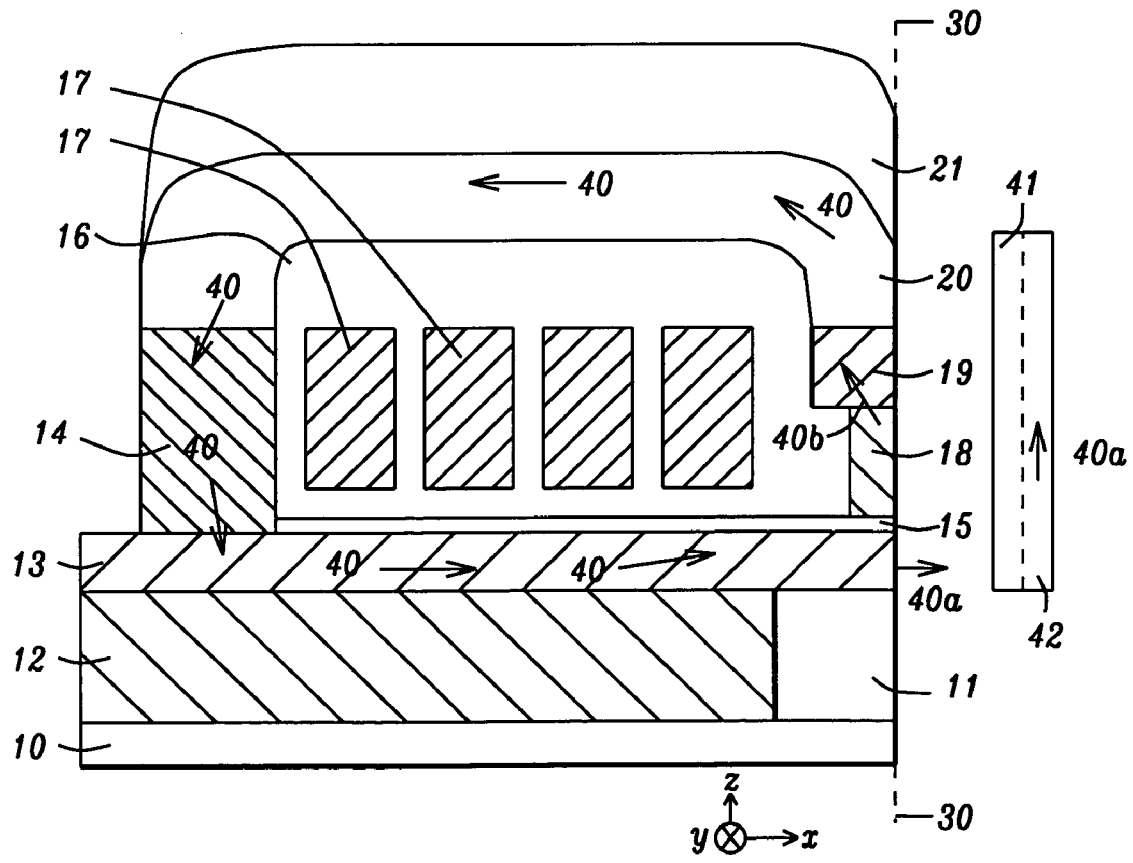
FIG. 6 is a cross-sectional view showing a magnetic flux path in the PMR write head of the present invention.

In FIG. 6, a magnetic flux path in the PMR write head of the present invention is illustrated. Note that the flux return pole is essentially comprised of the first write shield 18, second write shield 19, and third write shield comprised of layers 20, 21. A magnetic flux 40 generated by flowing an electrical current through the coil layer 17 passes through the bottom yoke 12 and main pole layer 13 before a first flux field 40a exits the main pole layer through the pole tip 13t and enters a recording layer 41 and a soft underlayer 42 in a magnetic medium (disk). A second flux field 40b passes from the main pole layer 13 to the first write shield 18 and then through the second write shield 19 before entering the third write shield comprised of layers 20, 21. Meanwhile, the first flux field 40a enters the third write shield at layers 20, 21 after exiting the recording layer 41. The magnetic flux path in the third write shield leads to the back gap 14 where the magnetic flux 40 transits the second write shield and first write shield above the connection area to reach the main pole layer 13 and bottom yoke 12.

The existing manufacturing process sequence employed to fabricate a third shield structure comprised of a single magnetic layer may be easily modified to include a composite CoFeNi alloy/CoFe alloy configuration according to the present invention. The better reader spacing at a fixed back-off position indicated previously leads to a better recording performance as can be measured in higher resolution, signal-to-noise ratio (SNR), and better bit error rate (BER). This improvement in performance can be translated into a higher areal density capability for the heads.

While this invention has been particularly shown and described with reference to, the preferred embodiment thereof, it will be understood by those skilled in the art that various changes in form and details may be made without departing from the spirit and scope of this invention.

We claim:

1. An upper write shield section of a PMR write head having a yoke/main pole layer stack in a top yoke or bottom yoke configuration with a pole tip at an air bearing surface (ABS), a first shield formed on the yoke/main pole layer stack along the ABS and at a back end region, and a second shield formed on the first shield along the ABS and at the back end region, comprising:

(a) a first layer made of a material optimized for either magnetic or mechanical performance that is formed on the second shield at the ABS and in said back end region, the first layer extends from the ABS to the back end region and is magnetically connected to the main pole through the first and second shields at the back end region; and (b) a second layer disposed on the first layer and optimized for a different performance than said first layer, said second layer is optimized for mechanical performance when the first layer is optimized for magnetic performance and said second layer is optimized for magnetic performance when said first layer is optimized for mechanical performance, the second layer extends from the ABS to the back end region and is magnetically connected to the main pole at the back end region.

2. The upper write shield section of claim 1 wherein said first layer is optimized for magnetic performance with high permeability and high saturation magnetization and is comprised of a CoFeNi alloy with a saturation magnetization of about 19 kG, and the second layer is optimized for mechanical performance with a low coefficient of thermal expansion (CTE) of from 0 to about $8 \times 10^{-6}$/K at 20° C. and is comprised of a CoFe alloy with a saturation magnetization of about 24 kG.

3. The upper write shield section of claim 1 wherein said first layer is optimized for mechanical performance with a low coefficient of thermal expansion (CTE) of from 0 to about $8 \times 10^{-6}$/K at 20° C. and is comprised of a CoFe alloy with a saturation magnetization of about 24 kG, and the second layer is optimized for magnetic performance with high permeability and a high saturation magnetization and is comprised of a CoFeNi alloy with a saturation magnetization of about 19 kG.

4. The upper write shield section of claim 1 wherein the PMR write head is formed on a substrate that is a separation layer made of $Al_2O_3$.

5. The upper write shield section of claim 1 wherein the first layer which is optimized for magnetic performance has a thickness from about 0.1 to 0.5 microns and the second layer optimized for mechanical performance has a thickness between about 0.3 and 3 microns.

6. A PMR write head formed on a substrate, comprising:
(a) a yoke/main pole layer stack formed on the substrate in a top yoke or bottom yoke configuration wherein the main pole layer terminates in a pole tip at an ABS;
(b) a write gap layer formed on the yoke/main pole layer stack except over a connection area in a back end region of the yoke/main pole layer stack;
(c) a first write shield formed on the write gap layer at the ABS and on the yoke/main pole layer stack in the connection area in said back end region;
(d) a second write shield formed on the first write shield above the connection area and at the ABS, said first write shield and second write shield form a back gap on the connection area;
(e) one or more insulation layers formed on the write gap layer between the back gap and the first and second write shields along the ABS;
(f) a coil layer with a plurality of turns formed in the one or more insulation layers; and
(g) a third write shield having a composite structure that is disposed on the one or more insulation layers and adjoins the second write shield at the ABS and the back gap above the connection area, said composite structure includes a lower magnetic layer with a first thickness, high saturation magnetization and high permeability, and an upper layer having a second thickness and low coefficient of thermal expansion, both of the lower magnetic layer and upper layer extend from the ABS to the back gap and are magnetically connected to the main pole through the back gap.

7. The PMR write head of claim 6 wherein the lower layer in the third write shield is comprised of a CoFeNi alloy and the upper layer in the third write shield is comprised of a CoFe alloy.

8. The PMR write head of claim 6 wherein the first thickness is from about 0.1 to 0.5 microns and the second thickness is between about 0.3 and 3 microns.

9. The PMR write head of claim 6 wherein the third write shield has a top surface that has an arched shape or is planar and formed perpendicular to the ABS.

10. The PMR write head of claim 6 wherein the substrate is a separation layer made $Al_2O_3$.

11. The PMR write head of claim 6 further comprised of an overcoat layer disposed on the third write shield.

* * * * *